United States Patent
Mishra et al.

(10) Patent No.: US 10,944,766 B2
(45) Date of Patent: Mar. 9, 2021

(54) CONFIGURABLE CYBER-ATTACK TRACKERS

(71) Applicant: Microsoft Technology Licensing, LLC, Redmond, WA (US)

(72) Inventors: Ashish Mishra, Bothell, WA (US); Puhazholi Vetrivel, Redmond, WA (US); Philip K Newman, Seattle, WA (US); Sudhakar Narayanamurthy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/876,339

(22) Filed: Jan. 22, 2018

(65) Prior Publication Data

US 2019/0098026 A1 Mar. 28, 2019

Related U.S. Application Data (60) Provisional application No. 62/561,940, filed on Sep. 22, 2017.

(51) Int. Cl.
*H04L 29/06* (2006.01)
*G06F 21/55* (2013.01)
(Continued)

(52) U.S. Cl.
CPC ........ *H04L 63/1416* (2013.01); *G06F 21/552* (2013.01); *G06F 21/554* (2013.01);
(Continued)

(58) Field of Classification Search
CPC . H04L 63/1416; H04L 67/22; H04L 63/1483; H04L 63/145; H04L 67/02;
(Continued)

(56) References Cited

U.S. PATENT DOCUMENTS 6,014,628 A * 1/2000 Kovarik, Jr. ........... G06Q 10/02
    700/226
8,839,435 B1 * 9/2014 King ....................... G06F 21/56
    726/24
(Continued)

FOREIGN PATENT DOCUMENTS

WO    2015134572 A1    9/2015
WO    2016014014 A1    1/2016

OTHER PUBLICATIONS

"International Search Report and Written Opinion Issued in PCT Application No. PCT/US2018/039219", dated Sep. 13, 2018, 14 Pages.

*Primary Examiner* — David J Pearson
*Assistant Examiner* — Badri Champakesan
(74) *Attorney, Agent, or Firm* — Christopher R. Christenson; Kelly, Holt & Christenson PLLC (57) ABSTRACT

A computing system includes a processor and memory coupled to the processor and storing instructions that, when executed by the processor provide a user interface module. The user interface module is configured to generate a tracker definition user interface having a threat parameter selection user interface element configured to receive a selection of at least one threat parameter, the tracker definition user interface also having a threat value user interface element configured to receive input specifying a threat value to match for the specified at least one threat parameter. The processor is configured to save a tracker based on the selection of at least one threat parameter and the threat value, and wherein the processor is configured to access a threat data store and execute the tracker against the threat data store to provide a tracker result.

18 Claims, 9 Drawing Sheets

(51) Int. Cl.
*G06F 21/56* (2013.01)
*H04L 12/58* (2006.01)
*H04L 29/08* (2006.01)
*G06F 3/0484* (2013.01)

(52) U.S. Cl.
CPC ............ *G06F 21/566* (2013.01); *H04L 51/34* (2013.01); *H04L 63/145* (2013.01); *H04L 63/1441* (2013.01); *H04L 63/1483* (2013.01); *H04L 67/22* (2013.01); *G06F 3/04847* (2013.01); *H04L 51/22* (2013.01); *H04L 67/02* (2013.01); *H04L 67/18* (2013.01)

(58) Field of Classification Search
CPC ..... H04L 51/22; H04L 63/1441; H04L 51/34; G06F 3/04847; G06F 21/566; G06F 21/554; G06F 21/552
USPC .......................................................... 726/23
See application file for complete search history.

(56) References Cited

U.S. PATENT DOCUMENTS

| | | | | |
|---|---|---|---|---|
| 9,082,128 B2 * | 7/2015 | Etchegoyen | ............ | G06Q 30/02 |
| 9,118,714 B1 * | 8/2015 | Thomson | ............ | H04L 63/1433 |
| 9,130,980 B2 * | 9/2015 | Law | ............ | H04L 63/0227 |
| 9,143,523 B2 * | 9/2015 | Evrard | ............ | G06F 21/577 |
| 9,548,988 B1 * | 1/2017 | Roundy | ............ | H04L 63/145 |
| 9,692,789 B2 * | 6/2017 | Kirti | ............ | H04L 63/20 |
| 9,876,742 B2 * | 1/2018 | Syrowitz | ............ | H04L 51/12 |
| 10,049,359 B2 * | 8/2018 | Lyda | ............ | G06Q 20/4014 |
| 10,397,256 B2 * | 8/2019 | Kashi | ............ | H04L 63/1425 |
| 2006/0075504 A1 * | 4/2006 | Liu | ............ | H04L 67/104 726/25 |
| 2007/0169194 A1 * | 7/2007 | Church | ............ | G06F 21/554 726/23 |
| 2008/0052137 A1 * | 2/2008 | Ziade | ............ | G06Q 40/06 705/4 |
| 2014/0095806 A1 * | 4/2014 | Fajardo | ............ | G06F 12/0831 711/146 |
| 2014/0241517 A1 * | 8/2014 | Varoglu | ............ | H04L 51/24 379/201.01 |
| 2015/0033322 A1 * | 1/2015 | Wang | ............ | H04L 63/0254 726/13 |
| 2015/0121526 A1 * | 4/2015 | McLarnon | ............ | G06F 16/955 726/23 |
| 2016/0088013 A1 * | 3/2016 | Watson | ............ | H04L 63/1458 726/25 |
| 2017/0063905 A1 * | 3/2017 | Muddu | ............ | G06F 3/0484 |
| 2017/0163666 A1 * | 6/2017 | Venkatramani | ..... | H04L 63/1416 |
| 2017/0257365 A1 * | 9/2017 | Gonzalez | ............ | H04L 63/1416 |
| 2017/0286671 A1 * | 10/2017 | Chari | ............ | G06F 21/552 |
| 2018/0101680 A1 * | 4/2018 | Valles | ............ | G06F 21/554 |
| 2018/0316705 A1 * | 11/2018 | Tsironis | ............ | H04L 41/22 |
| 2018/0316706 A1 * | 11/2018 | Tsironis | ............ | H04L 63/1408 |
| 2018/0316713 A1 * | 11/2018 | Tsironis | ............ | H04L 63/1433 |
| 2018/0316727 A1 * | 11/2018 | Tsironis | ............ | H04L 63/20 |
| 2019/0005269 A1 * | 1/2019 | Regner | ............ | G06F 21/602 |

* cited by examiner

CONFIGURABLE CYBER-ATTACK TRACKERS

CROSS-REFERENCE TO RELATED APPLICATION

The present application is based on and claims the benefit of U.S. provisional patent application Ser. No. 62/561,940, filed Sep. 22, 2017, the content of which is hereby incorporated by reference in its entirety.

BACKGROUND

Computers have become an integral part of everyday life. They are used for storing data, analysis, banking, communication, shopping, as well as many other uses. However, as we have grown to rely on computers more in our everyday life, the impact of cyber-security breaches, malware, and identity theft has grown as well. Malware scanners now scan virtually all communications, and users have learned that cyber-attacks can even arrive in spoofed communications from friends or acquaintances.

The discussion above is merely provided for general background information and is not intended to be used as an aid in determining the scope.

SUMMARY

A computing system includes a processor and memory coupled to the processor and storing instructions that, when executed by the processor provide a user interface module. The user interface module is configured to generate a tracker definition user interface having a threat parameter selection user interface element configured to receive a selection of at least one threat parameter, the tracker definition user interface also having a threat value user interface element configured to receive input specifying a threat value to match for the specified at least one threat parameter. The processor is configured to save a tracker based on the selection of at least one threat parameter and the threat value. The processor is configured to access a threat data store and execute the tracker against the threat data store to provide a tracker result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

In an enterprise, there are many signals flowing in that have relevance to security. Monitoring these signals; analyzing them to identify targeted attacks and compromises; engaging security personnel to do deep drilldown analysis and subsequent incident remediation in a high-level, intent-driven way without getting lost in the deluge of data is challenging, and at the same time, of great value to organizations.

While embodiments described herein generally have wide applicability to any electronic system that is susceptible to a cyber-attack, embodiments described herein are particularly useful for online systems that support a number of users. Thus, the remainder of this description will be described with respect to an on-line user productivity system providing electronic messaging, data storage system, and other features that are accessible over the internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 1:
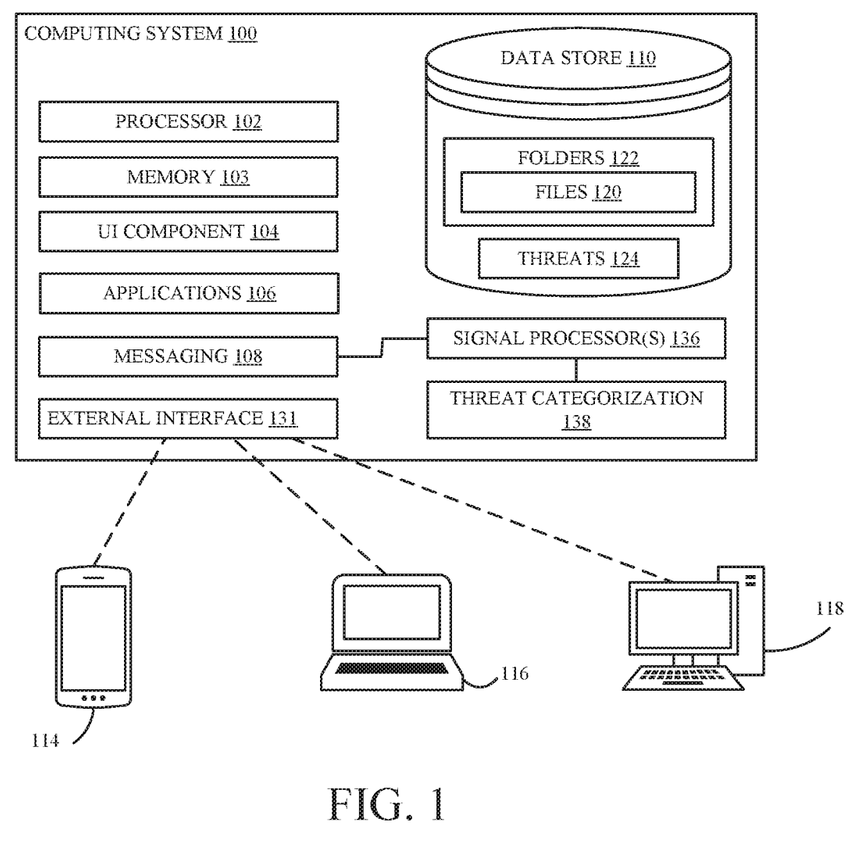
FIG. 1 is a diagrammatic view of a network-accessible computing system with which embodiments described herein are particularly useful.

FIG. 1 is a diagrammatic view of a computing system with which embodiments described herein are particularly useful. Computing system 100 includes processor 102, memory 103, user interface (UI) component 104, applications component 106, messaging component 108, and data store 110. Additionally, computing system 100 includes a network interface 131 or other arrangements to enable computing system 100 to connect to a network in order to provide access to devices 114, 116, and 118. Each of devices 114, 116, and 118 couples to or interacts with data storage system 100.

Processor 102 is illustratively a computer processor that has associated memory and timing circuitry, not separately shown. Processor 102 is illustratively a functional part of computing system 100 and facilitates the functionality of computing system 100 in providing access to functionality and data provided by computing system 100.

Memory 103 can be any suitable combination of volatile and non-volatile memory. Memory 103 is coupled to processor 102 and contains instructions that, when executed, provide various software components and modules of system 100. Such components include, without limitation, UI component 104, applications component 106, messaging component 108, and signal processor 136.

UI component 104 is illustratively controlled by other components, servers, or items in computing system 100 in order to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generates those user interface displays as well. Further, it will be noted that user interface component 104 can generate the user interface displays itself, or under the control of other items shown in FIG. 1.

The user interface displays illustratively include user input mechanisms that allow the users to control and manipulate computing system 100, in order to use functions of system 100, such as communicating using messaging component 108. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where computing system 100 or one of devices 114, 116, and 118 has speech recognition components, the user input mechanisms can also be actuated by using voice commands.

Applications component 106 can provide one or more applications for use by users of system 100. Examples of applications include word processing functions, spreadsheet functions, note taking functions, presentation functions, et cetera.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS) or any other device or logic that is able to provide messages to users. Further still, in embodiments where access to computing system 100 is provided to one or more of devices 114, 116, and 118 via an application executing upon said devices, messaging component 108 may include code and/or suitable circuitry to surface such messages or notifications within the application executing upon such user devices. While messaging component 108 is shown as a component of computing system 100, it is expressly contemplated that messaging component 108 may be remote from computing system 100 and controlled or otherwise engaged by computing system 100.

Data store 110 is shown as a single data store that is local to computing system 100. However, it will be noted that data store 110, in actuality, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users. Additionally, data store 110 also stores, in one embodiment, threat information generated by system 100 or received by system 100. Threat information can include any suitable information regarding individual threats and/or attacks.

Signal processor component 136 can include one or more signal processing logic units that couple to messaging component 108 and/or applications component 106 in order to detect signals that are relevant to cyber-attacks or threats. In a broad sense, the signals can be indicative of any computing system activity, or data, that has relevance to a cyber-attack or threat. Examples of such signals include the detection of an e-mail attachment having a file containing a known virus or malware. Another example would be an e-mail containing a message to entice a recipient to click on a link that activates malware or some other unsavory application on the user's system or elsewhere. Many threats are associated with e-mails and the remainder of this description will be focused on e-mail-related signals and the operation of messaging component 108.

When signal processor(s) 136 identifies a threat, it provides the identified threat to threat categorization component 138. The threat is categorized according to the type of threat, such as a virus, malware, phishing attack, etc. Additionally, other forms of categorization can be used in addition to or alternatively. Once the signal has been processed and the threat has been categorized, the threat information is generally saved in threat store 124 along with date/time information and any other suitable aspects related to the threat. In the context of e-mail, these various aspects that are also saved in threat store 124 can include, without limitation, attacker features such as sender e-mail address, sender domain, sender IP address/IP range, and sender country and location. Further, e-mail signals can include payload features such as mail subjects, mail fingerprints, URLs in the body of the email, attachment hashes in the email, original recipients in the email, malware verdict and any malware families tagged to the mail, phish verdict, and spam verdict. Further, signals may even include the victim or targeted users such a recipient e-mail, recipient domain, and recipient labels. Recipient labels will generally be provided by the administrator of a particular domain and will likely be related to the role of the recipient (such as marketing manager).

In accordance with an embodiment described herein, a user, such as a security administrator of a domain, is provided with the ability to generate one or more trackers in order to identify specific attacks having specified characteristics. Since the number of features that are tracked relative to threats are significant, these trackers allow security administrators to filter signals of interest, cluster the data points obtained based on features of interest to bubble up key patterns from the ambient noise, analyze trends on these clusters over time to surface threats that are more germane to that particular organization or domain. For example, a tracker may aggregate by sender IP, mail fingerprint binary, and recipient domain. This tracker can then be saved and periodically executed against threat data store 124 in order to provide updated information relative to the tracker. The saved tracker is essentially a saved query against the data of threat store 124.

While embodiments described herein generally describe the threats with respect to messaging component 108 and trackers that specify features of electronic messages, its expressly contemplated that such trackers can be directed to any aspects of threat signals stored in threat data store 124. In one embodiment, each tracker or saved query is generated with a specific time duration (e.g. last N hours, last N days, etc.). The time duration input is particularly useful in the context of threats in that it is believed that new threats and/or new changes in threat trends represent information of heightened interest to a security administrator. Accordingly, these aspects can be surfaced more quickly such that the threat can be addressed. Additionally, or alternatively, the tracker can be run for the specified time duration (e.g. last N hours, last N days) and threat aggregate data can be generated. This data can be used to identify new threats as well as compared with previous intervals to identify trends and changes.

Figure 2:
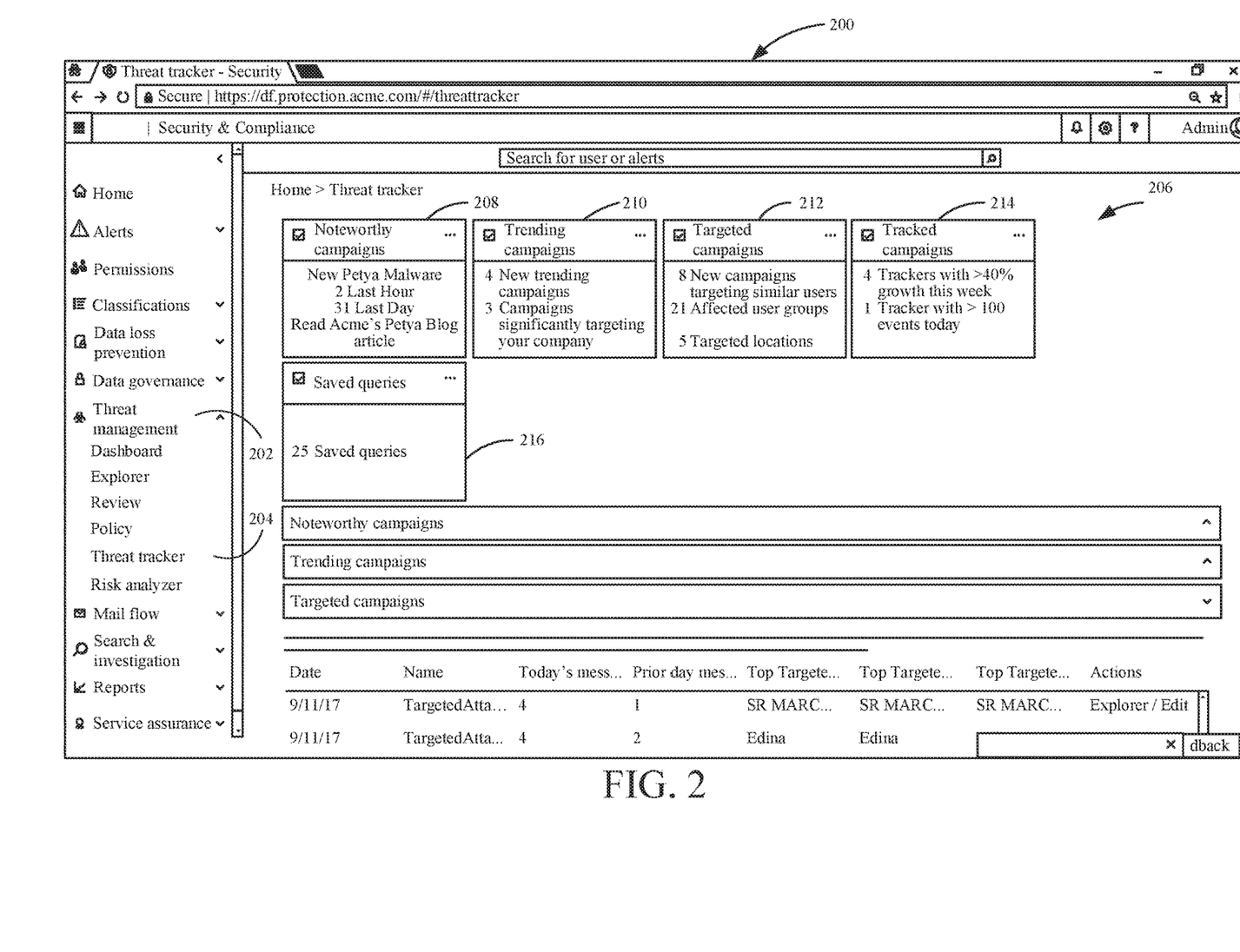
FIG. 2 is a diagrammatic view of a security console in accordance with one embodiment.

FIG. 2 is a diagrammatic view of an administration console 200 provided to an administrator by computing system 100 via UI component 104. FIG. 2 illustrates a security and compliance portion of a security administrator's portal for computing system 100. As shown in FIG. 2, the security administrator has selected threat management tab 202 and threat tracker user interface item 204. In response, pane 206 displays a number of tiles indicative of groups of threats. Noteworthy campaigns tile 208 provides an indication of noteworthy campaigns of general interest, beyond and outside of the scope of the organization. For example, these may be worldwide trends for malware attacks. In the example shown in tile 208, the tile indicates new Petya Malware with two attacks occurring in the last hour and thirty-one attacks occurring in the last day. Additionally, a link in provided in tile 208 to read a blog article regarding the noteworthy malware. This is an example of a tracker that may be provided by a software provider that can track attacks on a broad class of organizations. These trackers will show up to all tenants/organizations, and will track that specific attack on the particular organization. This provides the ability to surface out-of-the-box trackers to track attacks based on deep insight that the software provider or third party can provide to all tenants/organizations without the tenant needing to create anything.

Narrowing the scope, tile 210 provides information regarding trending campaigns that target the security administrator's organization or enterprise. As shown in tile 210, the example indicates that four new trending campaigns are targeting the organization and three campaigns significantly target the company.

Tile 212 provides information regarding Targeted campaigns. These targeted campaigns may target specific users within the organization or specific locations. As shown in the example, eight new campaigns target similar users. These may be users with similar roles within the organization. Additionally, twenty-one attacks targeted affected user groups, and five campaigns targeted specific locations.

Tile 214 provides information relative to tracked queries. The information this tile is based on threat signals that match one or more specified trackers of the security administrator. As shown in the example, four trackers have greater that 40% growth in the week. Additionally, one tracker is shown having over one hundred events in the current day. Additionally, a saved queries tile 216 indicates that twenty-five queries or trackers have been saved. By actuating tile 216, the security administrator can be taken to individual trackers in order to modify them.

Figure 3:
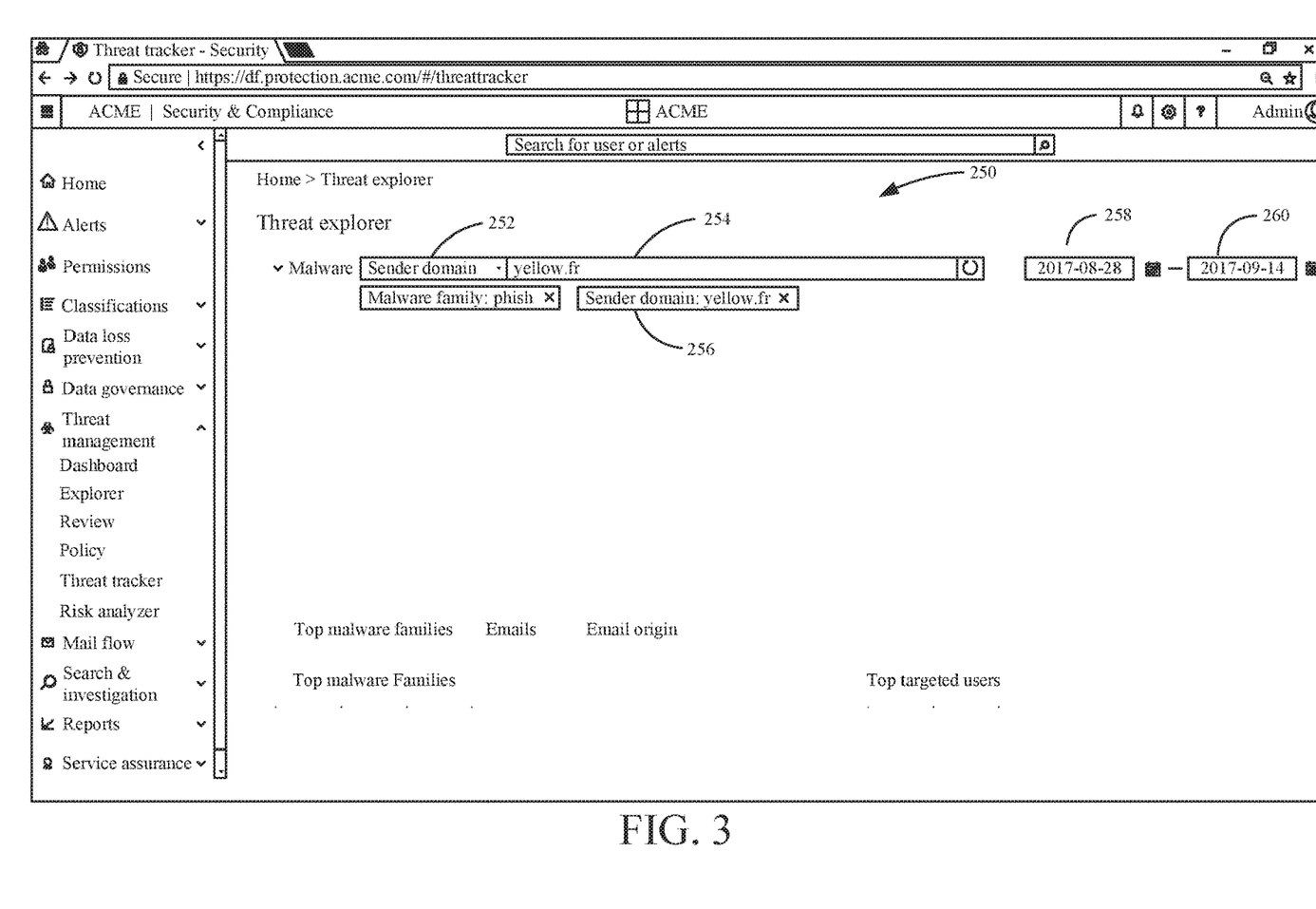
FIG. 3 is a diagrammatic view of a user interface of threat tracker creation system in accordance with one embodiment.

FIG. 3 is a diagrammatic view of a user interface of a security administrator's threat console providing for the generation and/or modification of trackers in accordance with one embodiment. User interface 250 includes user interface element 252 (in the example shown this is a dropdown box) that, when actuated, reveals a list of all potential parameters by which the treat information in threat data store 124 can be queried. In the e-mail example set forth above, this dropdown can reveal any of the signals set forth above. In the example shown in FIG. 3, box 252 shows sender domain. An additional user interface element 254 proximate box 252 allows the security administrator to specify criteria to match with the selected parameter. In the example shown, the security administrator has entered the text yellow.fr into the box. This generates a tracker criteria 256 shown below window 254 requiring that matching threat information from threat data store 124 have the text "yellow.fr" in sender domain.

The security administrator has a vast array of potential signals or parameters of the threats that can be selected and combined with other threat selections in order to cluster or otherwise identify threats that are particularly relevant to the security administrator's organization. Additionally, as shown in FIG. 3, a time window for the tracker is specified using initial time user interface element 258 and end time user interface element 260. Accordingly, only threat information matching the tracker's criteria and having a time criteria that matches that specified by the security administrator will surface in tracked queries tile 214 (shown in FIG. 2). While embodiments are described where trackers are defined with a time window, it is expressly contemplated that trackers can be defined without any time window in order to provider longer term treat tracking.

The tracker generation and modification shown with respect to FIGS. 2 and 3 provides the security administrator with significant flexibility in identifying cyber-attacks quickly and taking remedial action. This is particularly so since the sheer number of attacks that are automatically identified, analyzed, categorized, and stored is generally beyond the ability of a security administrator to address in a sequential manner. Accordingly, it is important to allow the security administrator to craft trackers that allow particular threats to be surfaced more quickly such that they can be addressed before others.

Figure 4:
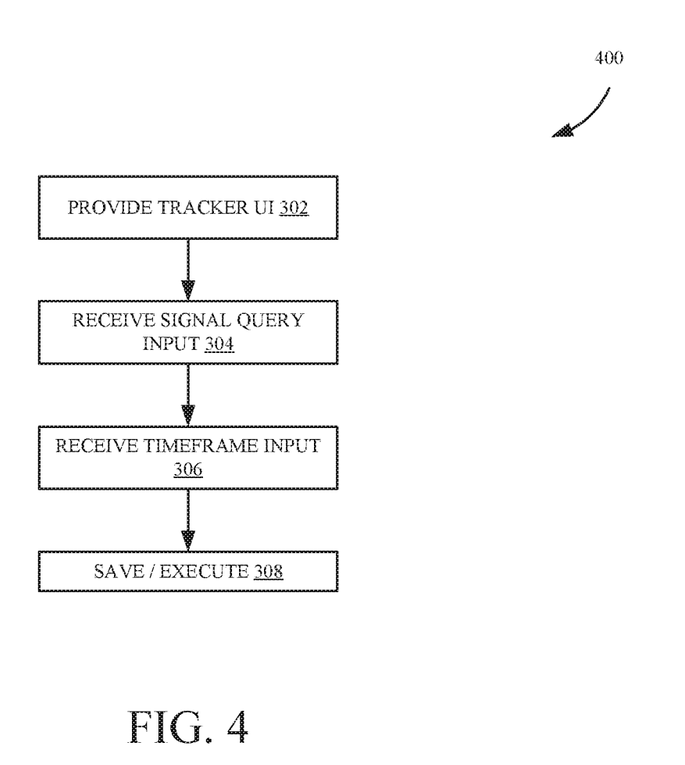
FIG. 4 is a flow diagram of a method of generating a cyber-attack security monitor in accordance with one embodiment.

FIG. 4 is a flow diagram of a method of generating a tracker for a cyber-attack in accordance with one embodiment. Method 300 begins at block 302 where a tracker generation user interface is provided to a user. One example of such interface is shown in FIG. 3. In response, the user provides signal query inputs via the provided UI. Receiving signal query inputs is indicated at block 304. Additionally, at block 306, a timeframe input is received specifying at least one time value with respect to threat signal information. Next, at block 308, the tracker is saved. Additionally, the tracker can be executed to show an immediate result based on the signal query input, timeframe input, and the data stored in threat store 124. Further, the saved tracker can be executed any time the user views threat tracker pane 206 (shown in FIG. 2) or any suitable other time. Further still, the trackers can be specified to independently generate a notification (such as an e-mail) to the user or and/or security administrator when a specified condition relative to the tracker occurs. For example, if the number of threats observed by the tracker within a particular timeframe exceeds a specified (such as user-defined) threshold, the automatic notification can be provided to the security administrator. Other forms of notification and other types of analysis (instead of comparing with a threshold) can be used to determine when and how to contact the security administrator regarding threat information that matches the stored tracker.

Figure 5:
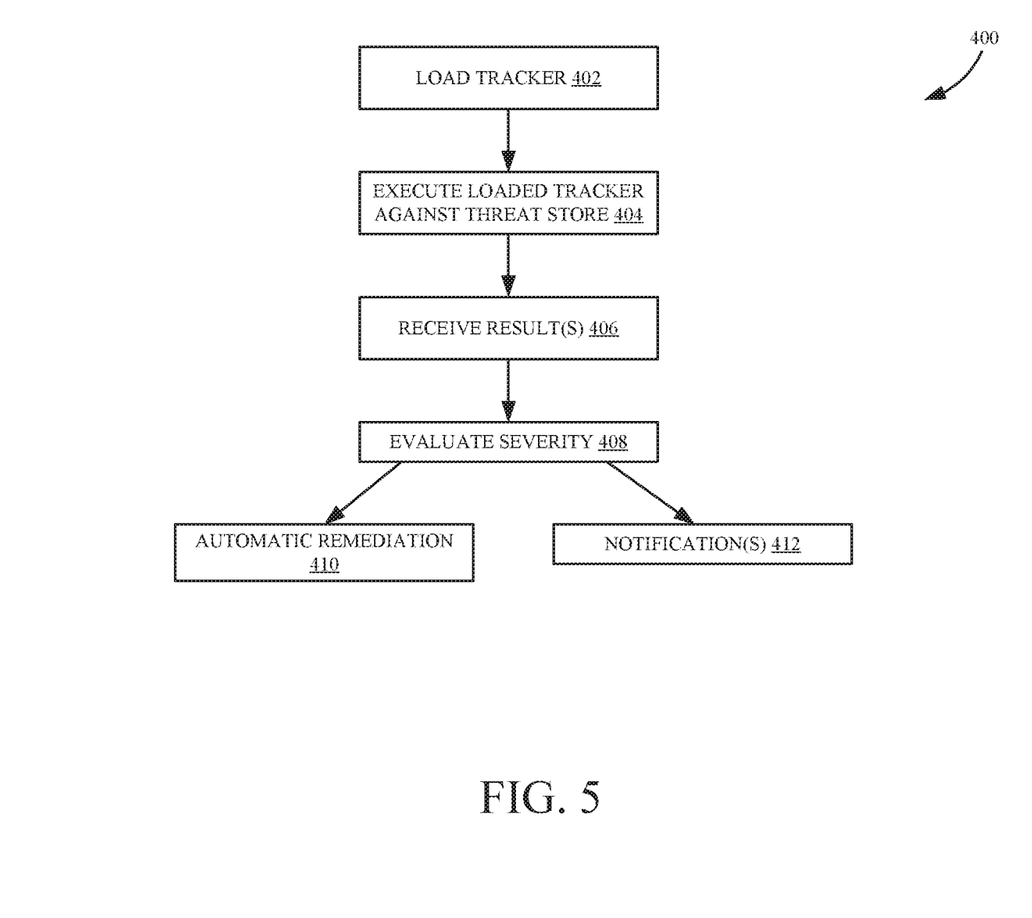
FIG. 5 is a flow diagram of a method of executing a configurable cyber-attack security monitor in accordance with one embodiment.

FIG. 5 is a flow diagram of a method of executing a configurable cyber-attack security monitor in accordance with one embodiment. Method 400 begins at block 402 where a configurable cyber-attack security monitor is loaded. For example, the configurable cyber-attack security monitor may be stored in any suitable location when block 308 (shown in FIG. 4) completes. Accordingly, at block 402, the configurable cyber-attack security monitor stored or otherwise persisted at block 308 can be accessed and loaded. Next, at block 404, the loaded configurable cyber-attack security monitor is executed against a threat store, such as threat store 124 (shown in FIG. 1). At block 406, one or more results are received that comply with the conditions of the configurable cyber-attack security monitor. The results may indicate one or more attacks that have occurred and/or are currently occurring. At block 408, the severity of the attack(s) is evaluated. This evaluation can be performed in any suitable manner. For example, a set of rules may be consulted where threat information relative to each cyber-attack or cyber-attack type is stored. If the result(s) received at block 406 exceed a threshold or other suitable condition set forth in the set of rules for the particular cyber-attack or cyber-attack type, automatic remediation 410 can be performed. If the threat is less severe, a suitable notification can be generated, as indicated at block 412.

Thus, the configurable cyber-attack security monitor(s) can be configured to automatically take remedial action. For example, if a tracker that represents a particularly virulent worm like NotPetya (which can spread on its own), indicates that an email instance with NotPetya was delivered, or any document with NotPetya is present in the organization's library, that it should be immediately removed. In such cases, the tracker can be configured with remediation actions to delete the email in any Inbox or Library folder. Accordingly, a tracker configured with remediation action will automatically take such action when it executes and identifies matching threats. For less severe situations, the tracker can be configured to generate the notification 412 in order to raise an alert. This can cause an administrator or security response team to take action, such as following a standard incidence response process to analyze the threat and take suitable action.

Embodiments provided herein generally improve the computing system by providing a more effective way for users to cluster or otherwise analyze myriad threat information in order to identify threats of particular interest. Embodiments generally provide a policy driven experience centered around security attack campaigns and security compromise. Accordingly, rather that deal with low level security events or tasks, security administrators can specify intent at a relatively high level in terms of attack campaigns or compromises. Further, there is a separation between policy and mechanics, and the ability to leverage multiple insight engines, such as provided at signal processor(s) 136, to implement the mechanics. Further, the intelligence system defined monitors can detect noteworthy campaigns or compromises using deep analysis of patterns across multiple signals. The embodiments described herein are generally extensible for security administrators and other concerned persons to generate their own trackers with indicators.

The full spectrum of management operations for security attacks and compromises can include alerting and notification to engage security administrators when cyber-attack campaigns or security compromises are detected with a configured level confidence. Further, a tracker can be configured to automatically take remedial action. Additionally, analysis and drill down abilities are provided where the threat information can be filtered, aggregated, and analyzed on demand. This facilitates trending and reporting, and ultimately more effective remediation.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be implemented on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
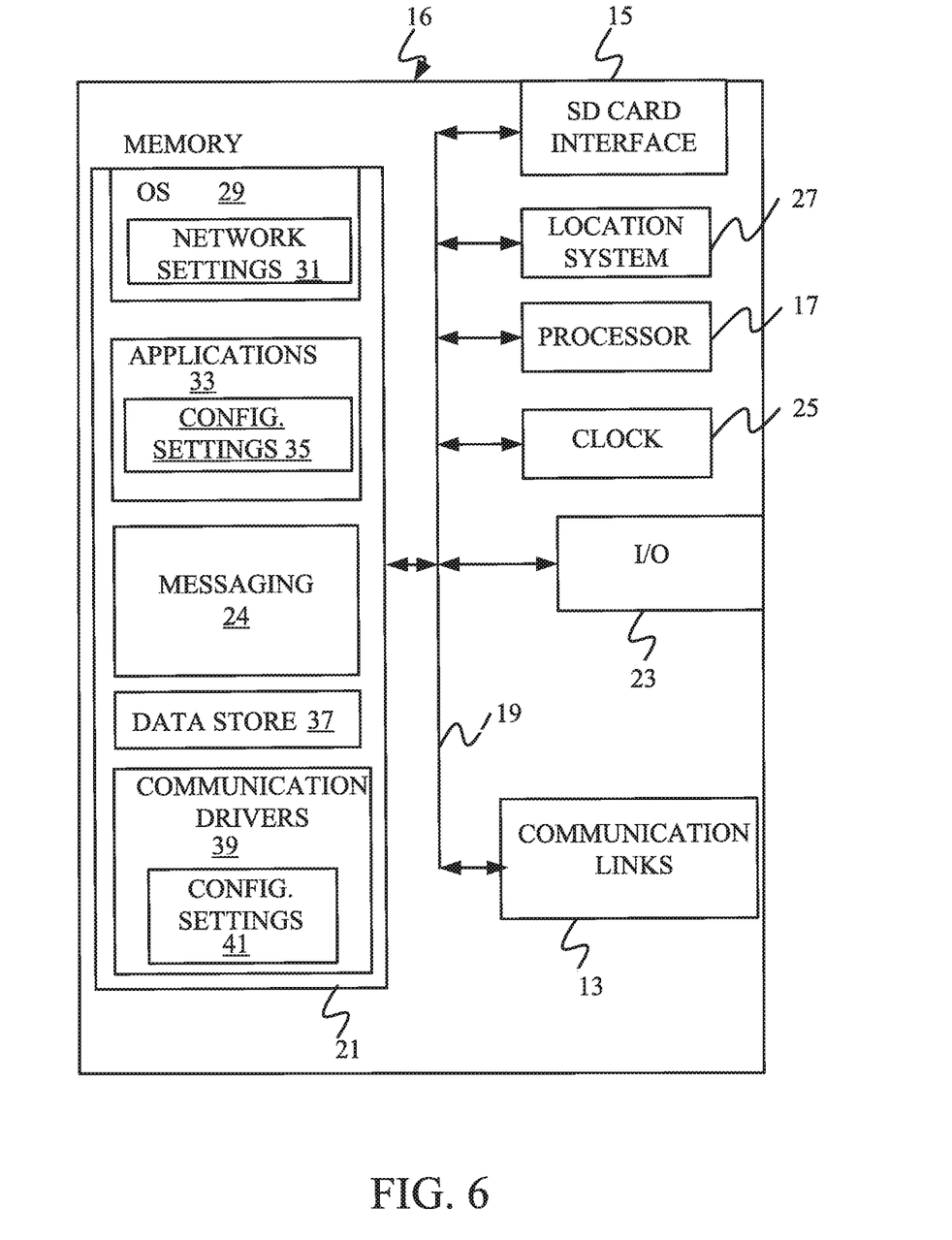
FIG. 6 provides a general block diagram of the components of a client device that can run components of the computing system to interact with the computing system.
Figure 7:
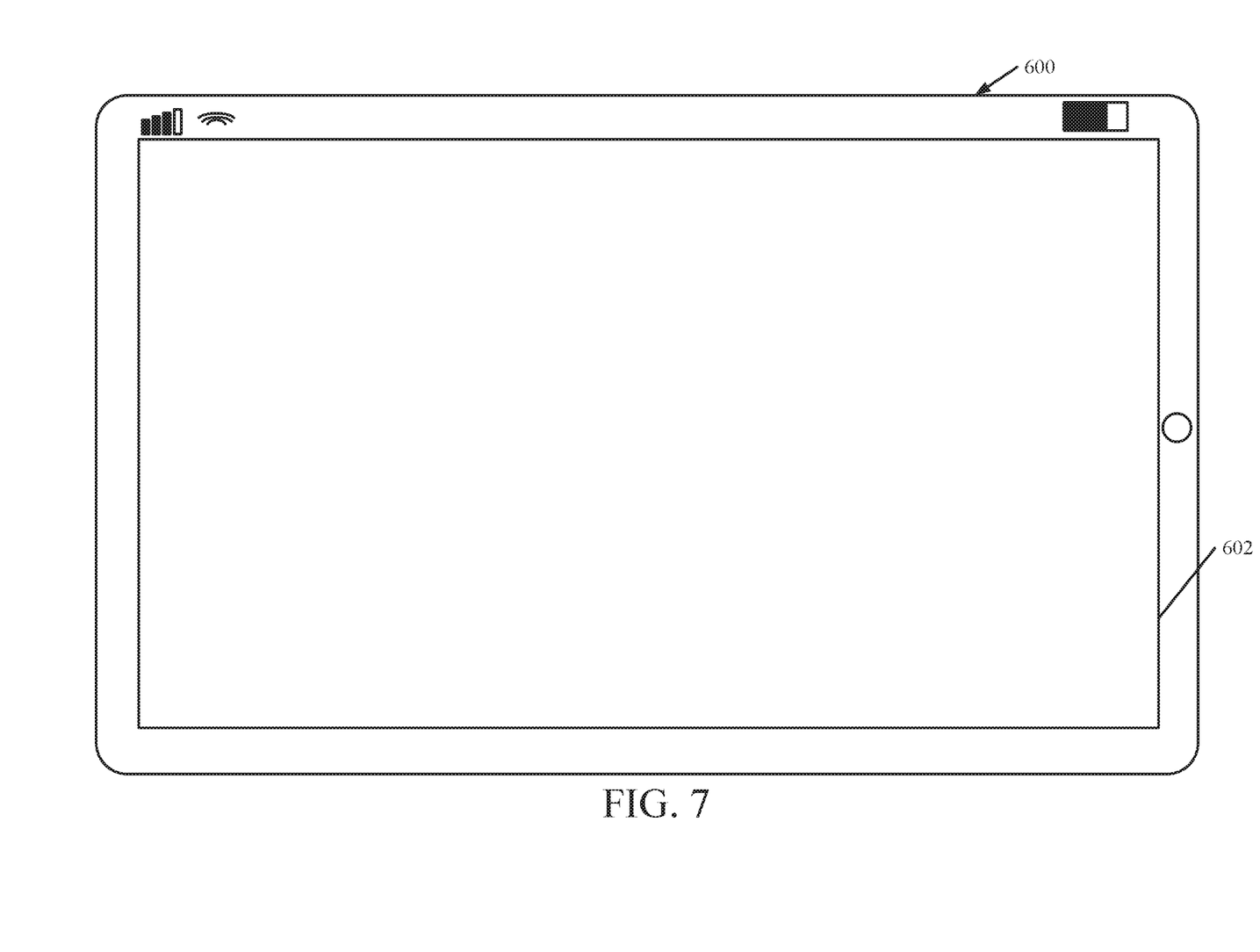
FIGS. 7 and 8 are diagrammatic views client devices that can run components of the computing system to interact with the computing system.
Figure 8:
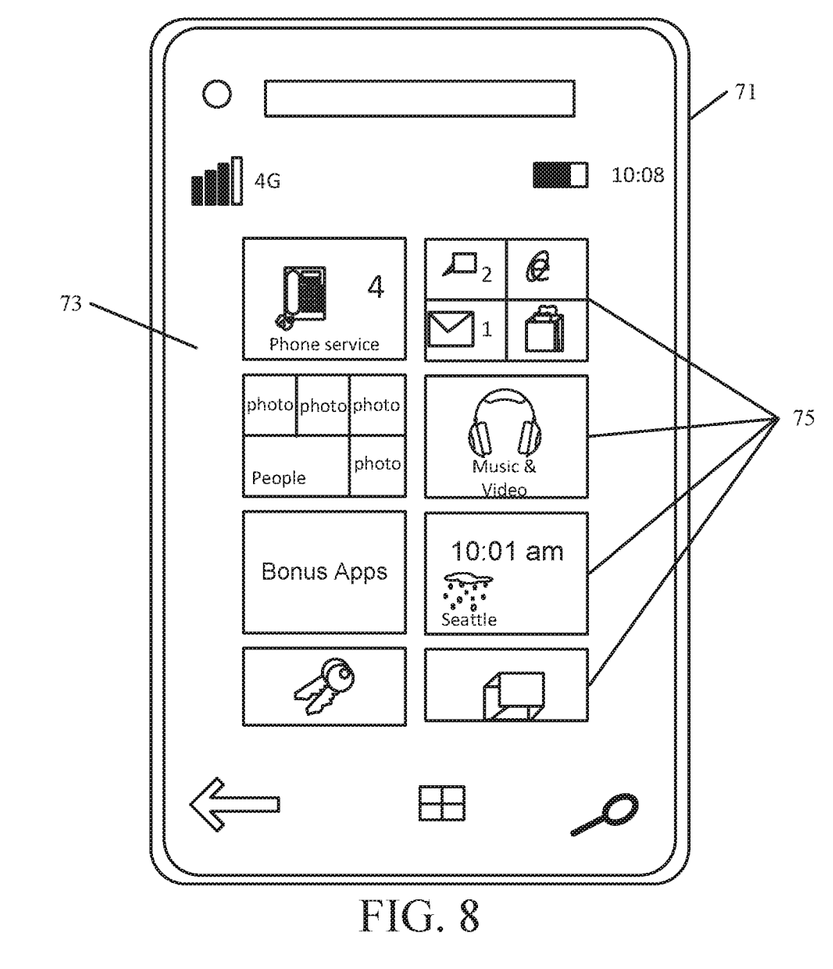

FIG. 6 is a simplified block diagram of one illustrative embodiment of a handheld or mobile computing device that can be used as a user's or client's hand held device 16, in which the present system (or parts of it) can be deployed. FIGS. 7 and 8 are examples of handheld or mobile devices.

FIG. 6 provides a general block diagram of the components of a client device 16 that can run components of computing system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100 through a suitable application programming interface.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 9:
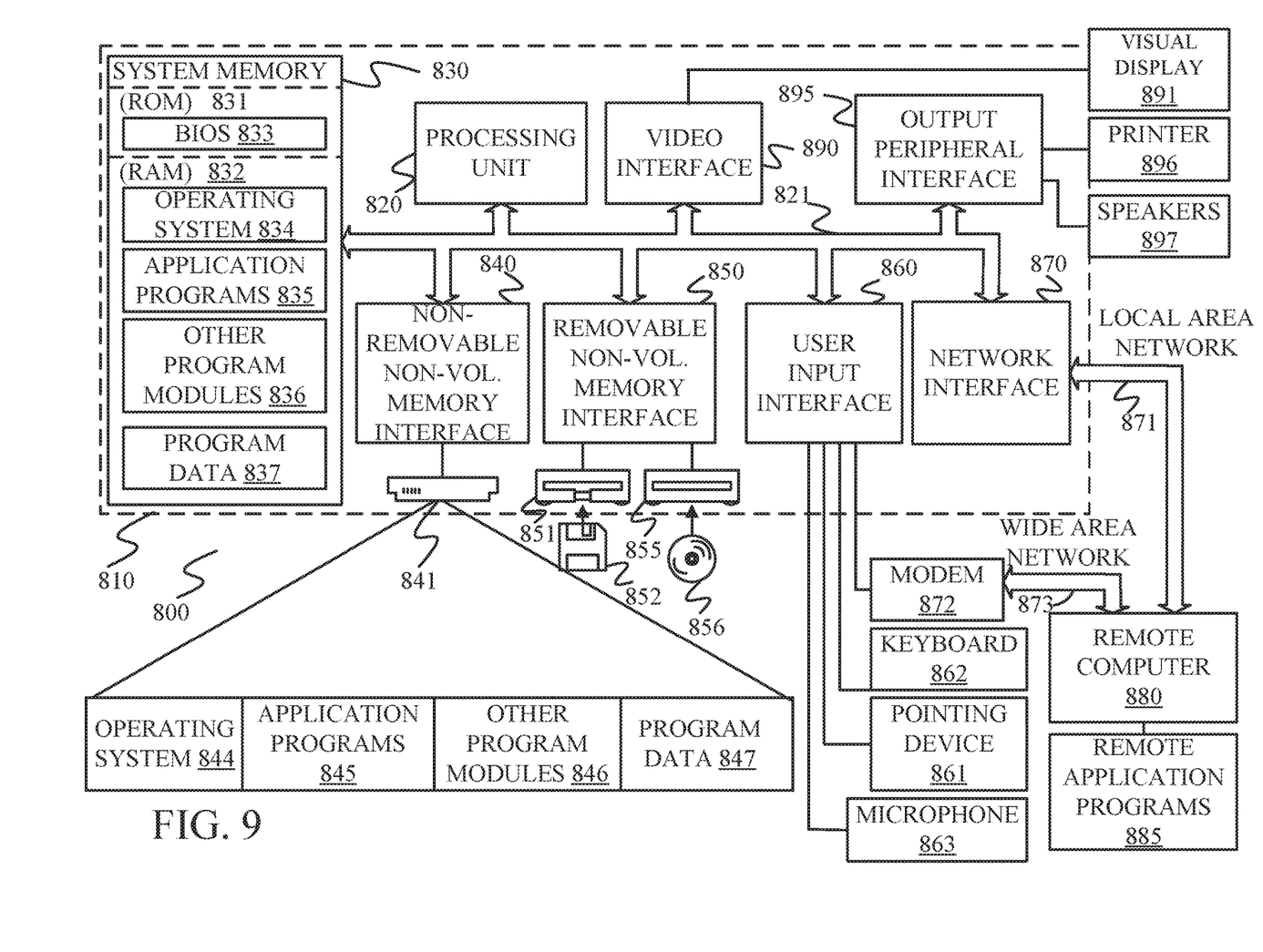
FIG. 9 is a general block diagram of a computing device that can run components of a network-accessible computing system for multiple users.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising: a processor and memory coupled to the processor and storing instructions that, when executed by the processor provide a user interface module. The user interface module is configured to generate a tracker definition user interface having a threat parameter selection user interface element configured to receive a selection of at least one threat parameter. The tracker definition user interface also has a threat value user interface element configured to receive input specifying a threat value to match for the specified at least one threat parameter. The processor is configured to save a tracker based on the selection of at least one threat parameter and the threat value, and wherein the processor is configured to access a threat data store and execute the tracker against the threat data store to provide a tracker result.

Example 2 is the computing system of any or all previous examples wherein the at least one threat parameter includes information related to an electronic communication.

Example 3 is the computing system of any or all previous examples wherein the electronic communication is email.

Example 4 is the computing system of any or all previous examples wherein the threat information includes an attacker feature.

Example 5 is the computing system of any or all previous examples wherein the attacker feature includes sender identification.

Example 6 is the computing system of any or all previous examples wherein the attacker feature includes a geographic location of the sender.

Example 7 is the computing system of any or all previous examples wherein the attacker feature includes sender IP address.

Example 8 is the computing system of any or all previous examples wherein the threat information includes payload information.

Example 9 is the computing system of any or all previous examples wherein the payload information includes a URL in a body of the email.

Example 10 is the computing system of any or all previous examples wherein the payload information includes an attachment has in the email.

Example 11 is the computing system of any or all previous examples wherein the payload information includes a malware verdict.

Example 12 is the computing system of any or all previous examples wherein the payload information includes a phish verdict.

Example 13 is the computing system of any or all previous examples wherein the threat information includes recipient domain.

Example 14 is the computing system of any or all previous examples wherein the threat information includes a recipient label.

Example 15 is the computing system of any or all previous examples wherein the tracker definition user interface includes time input user interface element configured to receive user input specifying a time period.

Example 16 is a method of generating a configurable cyber-attack tracker. The method includes providing a user interface that include a threat parameter selection component configured to receive at least one threat parameter user input; receiving at least one threat parameter user input with the threat parameter selection component; providing a threat value user input element configured to receive user input specifying a matching value for the at least one threat parameter user input; receiving a respective matching value for the each at least one threat parameter with the threat value user input element; providing a timing user input element configured to receive user input specifying a time window; receiving timing input specifying a time window with the timing user input element; executing a query against a threat data store based on the at least one threat parameter user input, each matching value, and the timing input; and providing query results.

Example 17 is the method of any or all previous examples and further comprising saving a tracker based on the at least one threat parameter user input, each matching value, and the timing input Example 18 is the method of any or all previous examples and further comprising automatically providing a notification based on analysis of the query results.

Example 19 is the method of any or all previous examples wherein the notification is an email and the analysis includes whether the query result exceeds a user-defined threshold.

Example 20 is a method of executing a customized cyber-attack tracker. The method includes accessing a tracker definition to identify a threat signal, associated matching value, and threat timing information; querying a threat data store to identify threat information in the data having the matching value in the identified threat signal and timing information satisfying the threat timing information; comparing the threat information to a user-defined threshold; and selectively generating a remedial action based on whether the threat information exceeds the user-defined threshold.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system comprising:
a processor;
memory coupled to the processor and storing instructions that, when executed by the processor, cause the computing system to:
process signals from a messaging component and an application component to detect a threat, the processed signals being relevant to the detected threat;
categorize the detected threat based on the processed signals according to a type of threat, to obtain a categorized detected threat, and wherein the categorized, detected threat is stored in a threat data store, wherein the type of threat is a threat selected from the group comprising malware, viruses, and phishing attacks;
generate a tracker definition user interface having:
a threat parameter selection user interface element configured to receive a selection of a threat parameter,
a threat value user interface element configured to receive input specifying a threat value for the selected threat parameter, and
a timing user interface element configured to receive user input for a particular timeframe;
save a tracker based on the selection of the threat parameter, the threat value and the user input for the particular timeframe;
in response to detecting a tracker triggering event,
execute the tracker against the threat data store to generate a tracker result having the threat parameter and threat value for categorized, detected threats in the threat data store; and
based on the execution of the tracker, generate an indication of a number of threat instances, within the particular timeframe in the detected computing activity, that correspond to the threat parameter and the threat value; and
selectively perform an automatic remedial action based on whether the number of threat instances within the particular timeframe exceeds a user-defined threshold.

2. The computing system of claim 1, wherein the threat parameter includes information related to an electronic communication.

3. The computing system of claim 2, wherein the information related to the electronic communication comprises an email message.

4. The computing system of claim 3, wherein the threat parameter includes an attacker feature.

5. The computing system of claim 4, wherein the attacker feature includes sender identification.

6. The computing system of claim 4, wherein the attacker feature includes a geographic location of a sender.

7. The computing system of claim 4, wherein the attacker feature includes sender IP address.

8. The computing system of claim 3, wherein the threat parameter includes payload information.

9. The computing system of claim 8, wherein the payload information includes a URL in a body of the email.

10. The computing system of claim 8, wherein the payload information includes an attachment has in the email.

11. The computing system of claim 8, wherein the payload information includes a malware verdict.

12. The computing system of claim 8, wherein the payload information includes a phish verdict.

13. The computing system of claim 3, wherein the signals represent threat information including recipient domain.

14. The computing system of claim 3, wherein the signals represent threat information including a recipient label.

15. A computer-implemented method comprising:
    detecting, with a signal processor operably coupled to at least one of a messaging component and an application component, a signal relevant to a threat;
    categorizing, with a threat categorization component, the detected signal to generate a categorized threat according to a type of threat, wherein the type of threat is a threat selected from the group comprising malware, viruses, and phishing attacks;
    storing the categorized threat in a threat data store;
    providing a user interface that include a threat parameter selection component configured to receive a threat parameter user input;
    receiving, via the threat parameter selection component, a selected threat parameter;
    providing a threat value user input element configured to receive user input specifying a threat value for the threat parameter user input;
    receiving, via the threat value user input component, a threat value for the selected threat parameter;
    providing a timing user input element configured to receive user input specifying a time window;
    receiving, via the timing user input element, a timing input specifying a specific time window;
    saving a tracker defined by the selected threat parameter, the threat value, and the timing input;
    in response to detecting a tracker triggering event,
        executing, by the saved tracker, a query against the threat data store, the query selecting categorized threat data in the threat data store based on the selected threat parameter and the threat value for the selected threat parameter; and
        based on the query, determining a number of threat instances, within the specified time window in the detected computing activity, that correspond to the selected threat parameter and the threat value for the selected threat parameter; and
    selectively generating an action based on whether the number of threat instances within the specified time window exceeds a user-defined threshold.

16. The method of claim 15, and wherein the action includes automatically providing a notification based on analysis of results of the query.

17. The method of claim 16, and further comprising generating an electronic mail (email) message that includes the notification.

18. A computer-implemented method comprising:
    detecting, with a signal processor operably coupled to at least one of a messaging component and an application component, a threat signal relevant to a threat;
    categorizing, with a threat categorization component, the threat signal according to a type of threat to generate a categorized threat, wherein the type of threat is a threat selected from the group comprising malware, viruses, and phishing attacks;
    storing the categorized threat in a threat data store;
    accessing a tracker definition to identify a threat parameter, threat parameter value, and specific threat timing information;
    using the tracker definition to query the threat data store and identify categorized threat information in the threat data store as a tracker result that indicates a number of threat instances, in the threat data store, that correspond to the threat parameter, the threat parameter value, and the threat timing information;
    determining that the number of threat instances exceeds a user-defined threshold; and selectively generating a remedial action based on the determination.

* * * * *